US012791492B2

(12) United States Patent
Fukui et al.

(10) Patent No.: US 12,791,492 B2
(45) Date of Patent: Nov. 10, 2026

(54) WELDED PORTION INSPECTION DEVICE AND WELDED PORTION INSPECTION METHOD

(71) Applicant: HONDA MOTOR CO., LTD., Tokyo (JP)

(72) Inventors: Satoshi Fukui, Tokyo (JP); Tomokatsu Nishiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 363 days.

(21) Appl. No.: 18/242,045

(22) Filed: Sep. 5, 2023

(65) Prior Publication Data

US 2024/0077427 A1 Mar. 7, 2024

(30) Foreign Application Priority Data

Sep. 7, 2022 (JP) ................................ 2022-141893

(51) Int. Cl.
*G01N 21/88* (2006.01)
*G01N 21/95* (2006.01)

(52) U.S. Cl.
CPC ..... *G01N 21/8851* (2013.01); *G01N 21/8806* (2013.01); *G01N 21/95* (2013.01); *G01N 2021/8887* (2013.01)

(58) Field of Classification Search
CPC .......... G01N 21/8851; G01N 21/8806; G01N 21/95; G01N 2021/8887; G01N 21/84; G01N 21/01; G01N 2021/0112; G01B 11/255; B23K 31/125
See application file for complete search history.

(56) References Cited

U.S. PATENT DOCUMENTS

2011/0222655 A1 9/2011 Murakami et al.
2019/0210158 A1 7/2019 Kamiyama et al.
2021/0291303 A1 9/2021 Mori et al.
2023/0298151 A1* 9/2023 Motonaga .............. H04N 23/56 348/92

FOREIGN PATENT DOCUMENTS

CN 102192919 9/2011
CN 110018160 7/2019
CN 112986282 A * 6/2021 ......... G01N 21/8851
(Continued)

OTHER PUBLICATIONS

JP-2022034723-A_translated (Year: 2022).*
JP-2021146390-A_translated (Year: 2021).*
JP-2015126660-A_translated (Year: 2015).*
WO-2017159532-A1_translated (Year: 2017).*
CN-112986282-A_translated (Year: 2021).*
(Continued)

*Primary Examiner* — Catherine T. Rastovski
*Assistant Examiner* — Michael J Singletary
(74) *Attorney, Agent, or Firm* — Amin, Turocy & Watson, LLP

(57) ABSTRACT

In a welded portion inspection device and a welded portion inspection method, an image of a welded portion including a reflection region of light is captured in a state where the light having a circular cross-sectional outer shape is projected on the welded portion. For the image, a circumscribed rectangle of the reflection region and an inscribed circle of the circumscribed rectangle are created. When the circularity of the inscribed circle is equal to or greater than a secondary determination threshold, the welding state of the welded portion is determined to be good.

6 Claims, 8 Drawing Sheets

(56) References Cited

FOREIGN PATENT DOCUMENTS

| | | | | | |
|---|---|---|---|---|---|
| CN | 114519688 | | | 5/2022 | |
| JP | 2001-116534 | | | 4/2001 | |
| JP | 2003-311464 | | | 11/2003 | |
| JP | 2004-354100 | | | 12/2004 | |
| JP | 2015126660 | A | * | 7/2015 | |
| JP | 2021146390 | A | * | 9/2021 | ........... G06T 7/0004 |
| JP | 2022-034723 | | | 3/2022 | |
| JP | 2022034723 | A | * | 3/2022 | |
| KR | 20200041647 | | | 4/2020 | |
| KR | 20210143681 | | | 11/2021 | |
| WO | 2013/186317 | | | 12/2013 | |
| WO | WO-2017159532 | A1 | * | 9/2017 | ........... B23K 31/125 |

OTHER PUBLICATIONS

Chinese Office Action and Search Report for Chinese Patent Application No. 202311151831.4 mailed Sep. 3, 2026.

Journal of Hunan City University (Natural Science) vol. 21 No.4, P65-68, “Applications of Image Processing Techniques in Solder Joint Detection” Edited by Sun Xiao-ting.

* cited by examiner

10

WELDED PORTION INSPECTION DEVICE AND WELDED PORTION INSPECTION METHOD

CROSS-REFERENCE TO RELATED APPLICATIONS

This application is based upon and claims the benefit of priority from Japanese Patent Application No. 2022-141893 filed on Sep. 7, 2022, the contents of which are incorporated herein by reference.

BACKGROUND OF THE INVENTION

Field of the Invention

The present invention relates to a welded portion inspection device and a welded portion inspection method.

Description of the Related Art

JP 2022-034723 A discloses an image inspection device that uses an image of a welded portion between coil tips to determine whether the welded portion is acceptable or not. Specifically, a plurality of slots are formed in a stator of a rotary electric machine. A coil is mounted in each of the plurality of slots. For each of the plurality of coils, a tip of the coil protrudes from the slot in the axial direction of the stator. The tip of the coil protruding from one slot and the tip of the coil protruding from another slot are joined by welding to form the welded portion. The image inspection device determines the quality of the welded portion by detecting the presence or absence of a defect in the welded portion, using the image of the welded portion.

SUMMARY OF THE INVENTION

However, in JP 2022-034723 A, the entire image of the welded portion is used to determine the presence or absence of a defect in the welded portion. Therefore, it takes man-hours to determine the presence or absence of a defect.

In addition, when dust such as slag adheres to the surface of the welded portion, the dust is captured in the image of the welded portion, and consequently the shape of the welded portion may appear to be abnormal. As a result, even though the welding state of the welded portion is normal, the welding state may be erroneously determined to be abnormal.

The present invention has the object of solving the aforementioned problems.

According to a first aspect of the present invention, there is provided a welded portion inspection device for inspecting quality of a welded portion between tips of coils, the welded portion inspection device including: an illumination unit configured to project light having a circular cross-sectional outer shape onto the welded portion; an imaging unit configured to capture an image of the welded portion, the image including a reflection region of the light in the welded portion; a circumscribed rectangle creation unit configured to create a circumscribed rectangle which is circumscribed around an outer periphery of the reflection region, in the image captured by the imaging unit; an inscribed circle creation unit configured to create an inscribed circle which is inscribed in the circumscribed rectangle created by the circumscribed rectangle creation unit; a first circularity calculation unit configured to calculate a degree of circularity of the inscribed circle created by the inscribed circle creation unit; and a first determination unit configured to determine that a welding state of the welded portion is normal when the degree of circularity calculated by the first circularity calculation unit is equal to or greater than a first threshold.

According to a second aspect of the present invention, there is provided a welded portion inspection method for inspecting quality of a welded portion between tips of coils, the method including: projecting light having a circular cross-sectional outer shape onto the welded portion; capturing an image of the welded portion, the image including a reflection region of the light in the welded portion; creating a circumscribed rectangle which is circumscribed around an outer periphery of the reflection region, in the captured image; creating an inscribed circle which is inscribed in the created circumscribed rectangle; calculating a degree of circularity of the created inscribed circle; and determining that a welding state of the welded portion is normal when the calculated degree of circularity is equal to or greater than a first threshold.

According to the present invention, it is possible to improve work efficiency and determination accuracy of inspection for the welding state of a welded portion.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
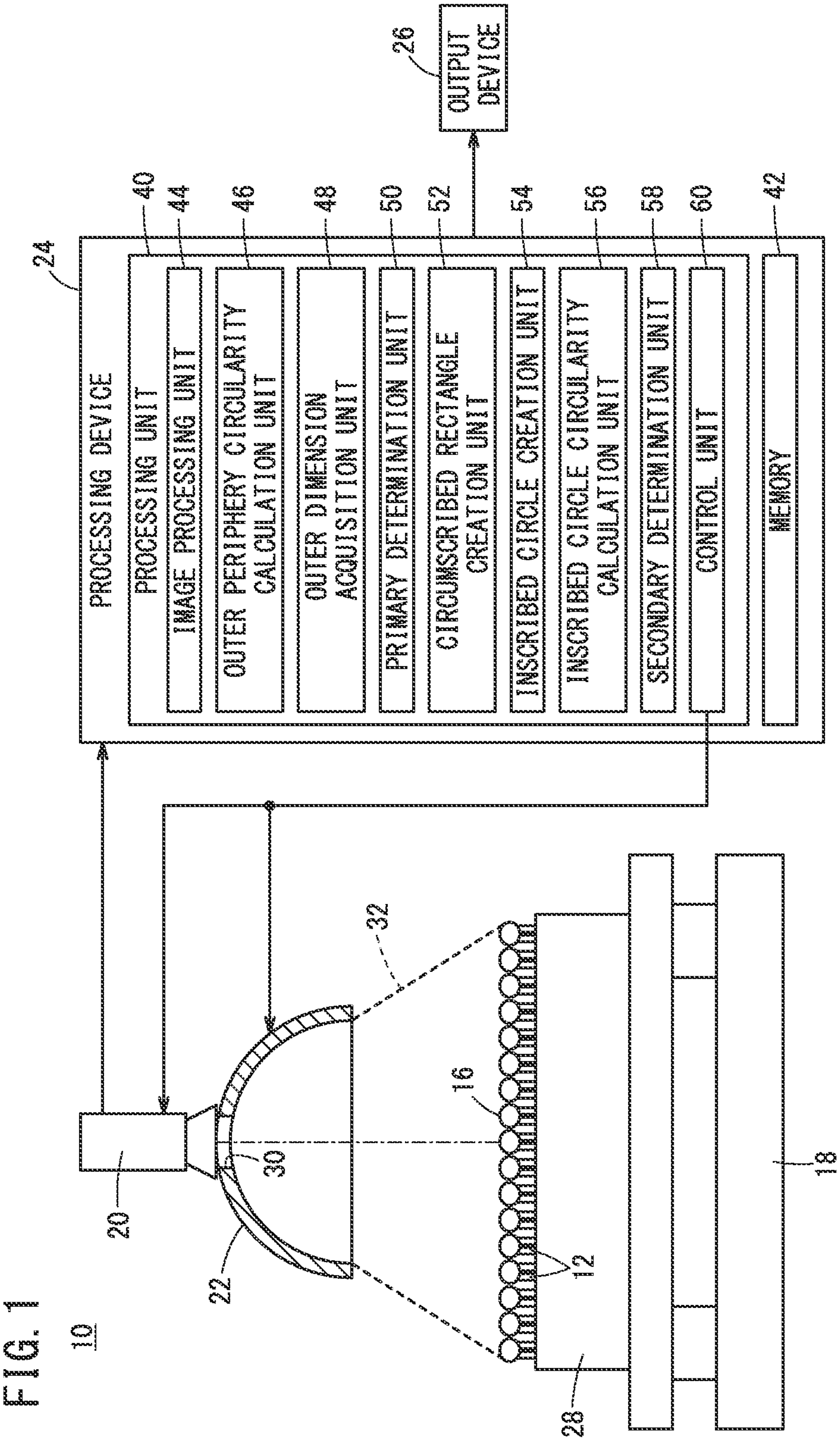
FIG. 1 is a configuration diagram of a welded portion inspection device according to an embodiment of the present invention.

FIG. 1 is a configuration diagram of a welded portion inspection device 10 according to an embodiment of the present invention. In FIG. 1, the configuration of the welded portion inspection device 10 will be described with the upper side of the drawing sheet as an upper direction and the lower side of the drawing sheet as a lower direction.

The welded portion inspection device 10 inspects whether a welding state of a welded portion 16 between tips 14 (see FIG. 2) of coils 12 is acceptable or not (the quality of the welded portion). The welded portion inspection device 10 includes a stage 18, an imaging unit 20, an illumination unit 22, a processing device 24, and an output device 26.

A stator 28 of a rotary electric machine (not shown) is mounted on an upper surface of the stage 18. The stator 28 is formed into a circular annular shape. The stator 28 is placed on the upper surface of the stage 18 such that one end portion of the stator 28 in its axial direction faces upward and the other end portion of the stator 28 in its axial direction faces downward.

The stator 28 includes thereinside a plurality of slots (not shown) that are formed at predetermined angular intervals. Each of the plurality of slots extends in the axial direction of the stator 28 (the up-down direction in FIG. 1) inside the stator 28. A coil 12 is mounted in each of the plurality of slots. For each of the plurality of coils 12, the tip 14 of the coil 12 protrudes from the slot in the axial direction of the stator 28.

Figure 2:
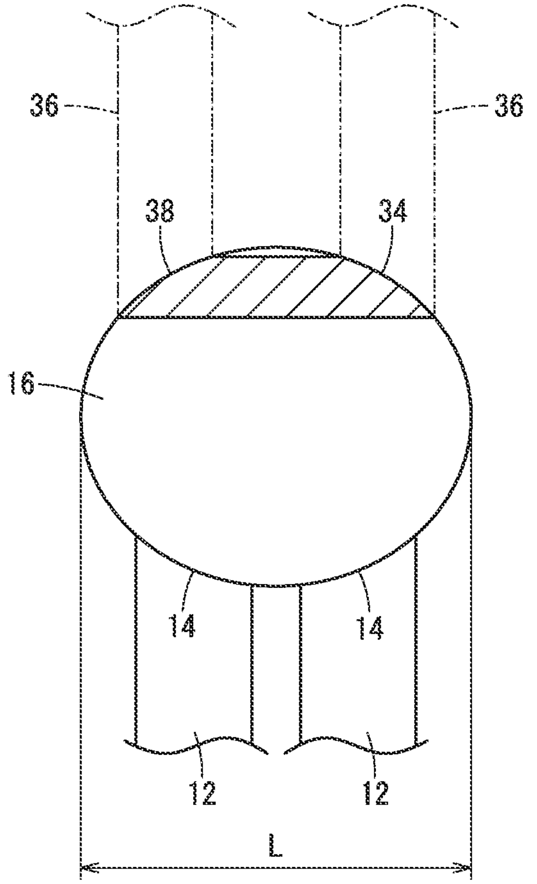
FIG. 2 is a side view of a welded portion.

As shown in FIG. 2, of the two coils 12, the tip 14 of one coil 12 protruding from one slot in the axial direction and the tip 14 of the other coil 12 protruding from the other slot in the axial direction are joined by welding. The tips 14 of the two coils 12 are joined together by welding to form a welded portion 16. The welded portion 16 is a weld bead formed by welding the tips 14 of the two coils 12. Since the stator 28 includes the plurality of coils 12, a plurality of the welded portions 16 are formed in the stator 28.

As shown in FIG. 1, the illumination unit 22 is a hemispherical illumination device. The illumination unit 22 is a circular annular illumination device in which an opening 30 is formed in a central portion of the illumination unit. The illumination unit 22 is disposed above the stage 18. Preferably, the illumination unit 22 is coaxial with the stator 28. The illumination unit 22 projects light 32 having a circular cross-sectional outer shape, to the one end portion of the stator 28 along the axial direction of the stator 28 in a state of facing the one end portion of the stator 28. Since the opening 30 is formed in the central portion of the illumination unit 22, the illumination unit 22 projects the circular annular light 32 to the one end portion of the stator 28 along the axial direction of the stator 28. Circular annular light 32 is projected from the illumination unit 22 onto each of the plurality of welded portions 16 (see FIG. 2).

When the circular annular light 32 is projected, each of the plurality of welded portions 16 reflects the projected light 32. For each of the plurality of welded portions 16, the light 32 projected onto an upper portion 34 of the welded portion 16 that faces the illumination unit 22 is reflected upward as reflected light 36. That is, for each of the plurality of welded portions 16, a reflection region 38 that reflects the projected light 32 upward is formed on the upper portion 34 of the welded portion 16. Incidentally, the upper portion 34 is a portion of the welded portion 16 that is axially away from the stator 28. Further, since the circular annular light 32 is projected, a non-reflection region corresponding to the opening 30 is formed on an inner side of the reflection region 38 (see FIGS. 2 and 3A).

The imaging unit 20 is disposed above the illumination unit 22. The imaging unit 20 is preferably coaxial with the illumination unit 22 and the stator 28. The imaging unit 20 is a camera that images the plurality of welded portions 16 from above through the opening 30 of the illumination unit 22. The imaging unit 20 captures images of the plurality of welded portions 16 including the upper portions 34. The reflected light 36 enters the imaging unit 20 via the opening 30 of the illumination unit 22. Therefore, the imaging unit 20 captures images of the plurality of welded portions 16 including the reflection regions 38.

As shown in FIG. 1, the processing device 24 is a computer for inspecting the quality of the welding state of the plurality of welded portions 16 by using the images of the plurality of welded portions 16 captured by the imaging unit 20. The processing device 24 includes a processing unit 40 and a memory 42.

The processing unit 40 is a processor of a computer. The processing unit 40 may be configured by a processor such as a central processing unit (CPU) or a graphics processing unit (GPU). That is, the processing unit 40 may be configured by processing circuitry. The processing unit 40 reads and executes a program stored in the memory 42 to realize functions of an image processing unit 44, an outer periphery circularity calculation unit 46 (second circularity calculation unit), an outer dimension acquisition unit 48 (acquisition unit), a primary determination unit 50 (second determination unit), a circumscribed rectangle creation unit 52, an inscribed circle creation unit 54, an inscribed circle circularity calculation unit 56 (first circularity calculation unit), an secondary determination unit 58 (first determination unit), and a control unit 60. Details of each unit realized by the processing unit 40 will be described later.

At least a part of the image processing unit 44, the outer periphery circularity calculation unit 46, the outer dimension acquisition unit 48, the primary determination unit 50, the circumscribed rectangle creation unit 52, the inscribed circle creation unit 54, the inscribed circle circularity calculation unit 56, the secondary determination unit 58, and the control unit 60 may be realized by integrated circuits such as an application specific integrated circuit (ASIC), a field-programmable gate array (FPGA), or the like. At least a part of the image processing unit 44, the outer periphery circularity calculation unit 46, the outer dimension acquisition unit 48, the primary determination unit 50, the circumscribed rectangle creation unit 52, the inscribed circle creation unit 54, the inscribed circle circularity calculation unit 56, the secondary determination unit 58, and the control unit 60 may be configured by an electronic circuit including a discrete device.

In addition to the program described above, the memory 42 stores images of the plurality of welded portions 16 captured by the imaging unit 20. In addition, the memory 42 stores processing results and the like by the processing unit 40.

The memory 42 may include a volatile memory (not shown) and a non-volatile memory (not shown). Examples of the volatile memory may include a random access memory (RAM). The volatile memory is used as a working memory of the processor, and temporarily stores data and the like necessary for processing or calculation. Examples of the non-volatile memory include a read only memory (ROM) and a flash memory. The non-volatile memory is used as a storage memory to store programs, tables, maps and the like. At least a portion of the memory 42 may be included in a processor, integrated circuit, or the like as described above.

The output device 26 is a display device such as a display. The output device 26 outputs the processing result of the processing device 24 including the quality of the welding state of the plurality of welded portions 16, to the outside.

As described above, the welded portion inspection device 10 (see FIG. 1) inspects the quality of the welding state of the plurality of welded portions 16 (see FIG. 2). Specifically, in the welded portion inspection device 10, the ideal shape for each of the plurality of welded portions 16 is spherical. When each of the plurality of welded portions 16 has a spherical shape, the welded portion inspection device 10 determines that the welding state of the welded portion 16 is good (acceptable) (normal). When each of the plurality of welded portions 16 has a shape other than a sphere, the welded portion inspection device 10 determines that the welding state of the welded portion 16 is defective (unacceptable) (abnormal). A specific determination method will be described later.

Figure 3A:
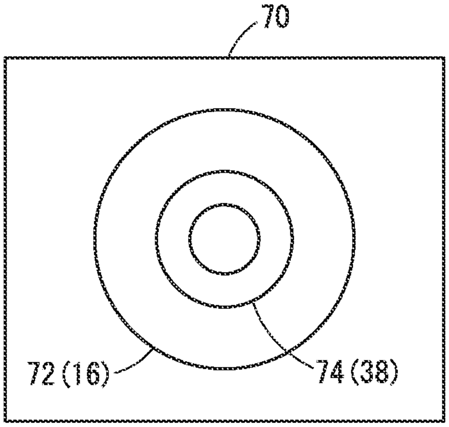
FIG. 3A is a diagram illustrating an image of the welded portion captured by an imaging unit.
Figure 3B:
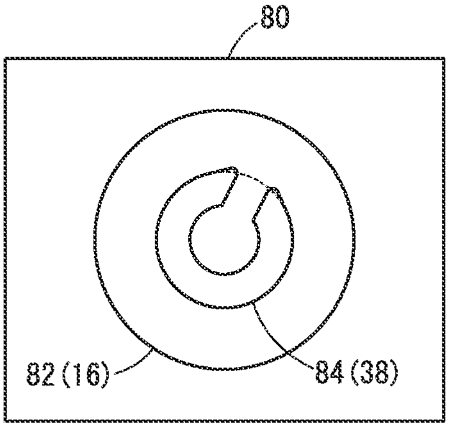
FIG. 3B is a diagram illustrating an image of the welded portion captured by the imaging unit.
Figure 3C:
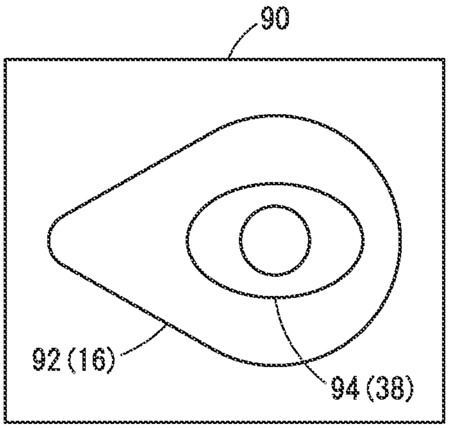
FIG. 3C is a diagram illustrating an image of the welded portion captured by the imaging unit.

FIGS. 3A to 3C show images of the plurality of welded portions 16 captured by the imaging unit 20 (see FIG. 1). It should be noted that in FIGS. 3A to 3C, image regions of part of the welded portions 16 that are extracted from one image of the plurality of welded portions 16 are shown.

FIG. 3A shows an image 70 of a welded portion 16 when the welded portion 16 is spherical. When the welded portion 16 has a spherical shape, an image region 72 of the welded portion 16 in the image 70 has a circular shape. An image region 74 of the reflection region 38 is seen in the central portion of the image region 72. As described above, since the circular annular light 32 (see FIG. 1) is projected onto the welded portion 16, the image region 74 of the reflection region 38 has a circular annular shape. That is, when the welding state of the welded portion 16 is acceptable, the image region 72 has a circular shape and the image region 74 has a circular annular shape.

FIG. 3B illustrates an image 80 of the welded portion 16 in a case where dust (not illustrated) such as slag adheres to the upper portion 34 (see FIG. 2) of the welded portion 16 although the welded portion 16 has a spherical shape. The dust adheres to the upper portion 34 of the welded portion 16 so as to cover part of the reflection region 38. A location where the dust adheres thereto hinders reflection of the projected light 32 (see FIG. 1). As a result, in the image 80, an image region 82 of the welded portion 16 has a circular shape, but an image region 84 of the reflection region 38 has a shape in which a circular annular shape is partially missing. In other words, in the image region 84, a partially missing portion is an image region to which dust is attached.

FIG. 3C shows an image 90 of the welded portion 16 when the welded portion 16 has a shape other than a sphere. More specifically, the welded portion 16 has an ellipsoidal shape. Since the welded portion 16 is not spherical, the welding state of the welded portion 16 is defective (abnormal). In this case, when the circular annular light 32 (see FIG. 1) is projected onto the upper portion 34 (see FIG. 2) of the welded portion 16, an elliptical reflection region 38 is formed. Therefore, in the image 90, an image region 92 of the welded portion 16 and an image region 94 of the reflection region 38 each have an elliptical shape. That is, when the welding state of the welded portion 16 is defective, the image region 92 has a shape (elliptical shape) other than a circle, and the image region 94 has a shape (elliptical shape) other than a circular annular shape.

Next, an operation (welded portion inspection method) of the welded portion inspection device 10 according to the present embodiment will be described with reference to FIGS. 4 to 8. In the description of the operation, FIGS. 1 to 3C are also referred to as necessary.

Figure 4:
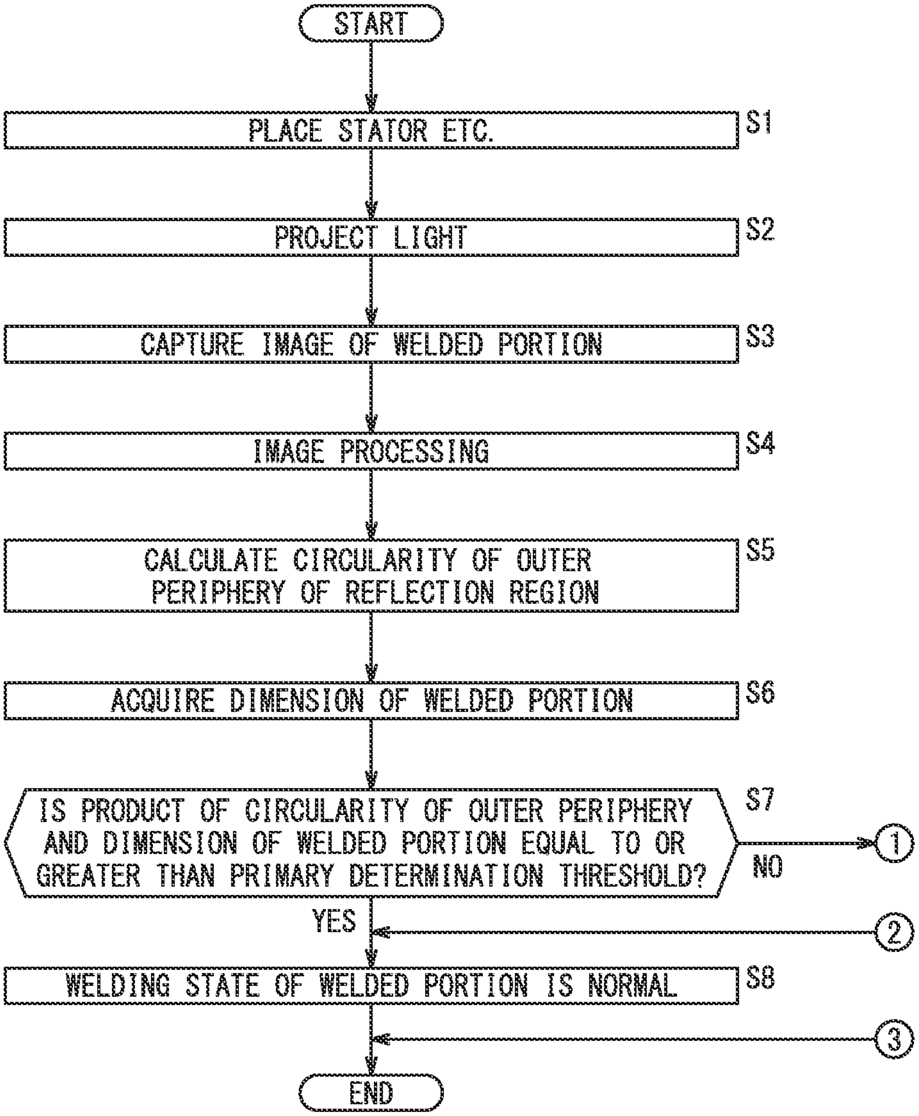
FIG. 4 is a flowchart showing the operation of the welded portion inspection device (welded portion inspection method)

In step S1 of FIG. 4, the stator 28 is placed on the upper surface of the stage 18 (see FIG. 1). Next, the illumination unit 22 and the imaging unit 20 are disposed above the stator 28. In this case, the illumination unit 22 and the imaging unit 20 are arranged with respect to the stator 28 in the order illustrated in FIG. 1.

In step S2, the illumination unit 22 projects the circular annular light 32 to the one end portion of the stator 28 under the control of the control unit 60. Thus, the circular annular light 32 is projected onto the welded portions 16 (see FIG. 2). The light 32 projected onto the upper portions 34 of the welded portions 16 is reflected upwardly as reflected light 36. In other words, the reflection region 38 that reflects the projected light 32 is formed on the upper portion 34 of each welded portion 16.

In step S3, the imaging unit 20 captures an image of the welded portions 16 including the reflection regions 38, through the opening 30 of the illumination unit 22 in accordance with the control from the control unit 60. As described above, the plurality of welded portions 16 are formed at the one end portion of the stator 28. Therefore, the imaging unit 20 captures an image of the plurality of welded portions 16 formed at the one end portion of the stator 28, in one-time imaging. The imaging unit 20 outputs the captured image of the plurality of welded portions 16 to the processing device 24. The processing device 24 stores the input image of the plurality of welded portions 16, in the memory 42.

Prior to capturing the image of the plurality of welded portions 16, the imaging unit 20 performs focus adjustment and adjustment of the depth of field with respect to the plurality of welded portions 16. The imaging unit 20 performs focus adjustment such that the center of each welded portion 16 is the focus position.

In step S4, the image processing unit 44 (see FIG. 1) reads the image of the plurality of welded portions 16 from the memory 42, and performs predetermined image processing on the read image of the plurality of welded portions 16. Specifically, the image processing unit 44 performs binarization processing on the image of the plurality of welded portions 16.

In this case, the image processing unit 44 may perform the binarization processing on each of the plurality of welded portions 16, for example. In the following description, a case will be described in which the binarization processing is performed on one welded portion 16 and the quality of the welding state of the welded portion 16 is inspected using the image of the welded portion 16 after the binarization processing.

Figure 6:
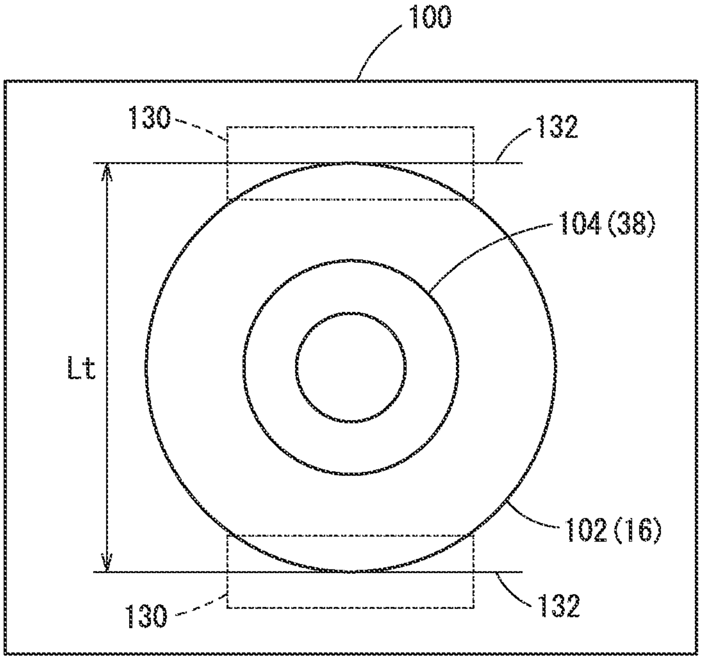
FIG. 6 is a diagram illustrating an image of a welded portion when the welded portion is spherical.

FIG. 6 shows an image 100 obtained by performing binarization processing on the image 70 (see FIG. 3A). In the image 100, an image region 102 of the welded portion 16 corresponding to the image region 72 and an image region 104 of the reflection region 38 corresponding to the image region 74 are captured.

Figure 7A:
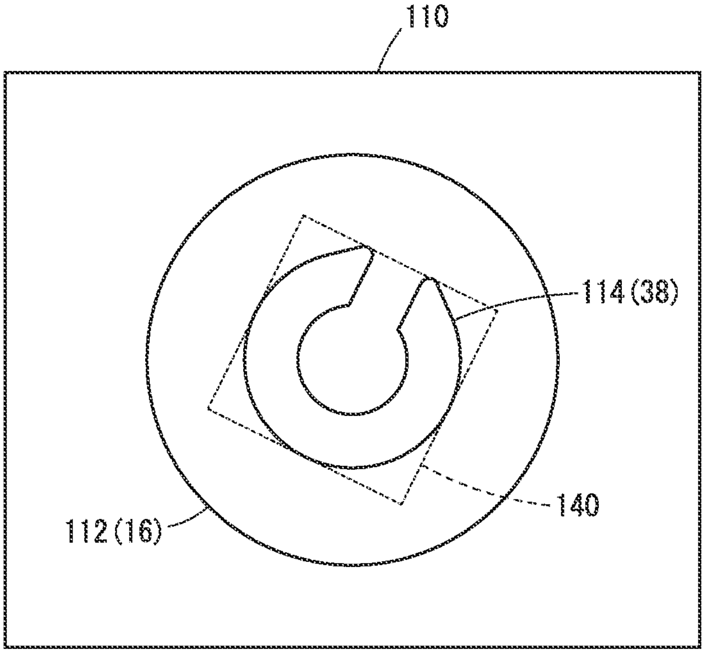
FIG. 7A is a diagram showing an image of the welded portion when part of a reflection region is missing.
Figure 7B:
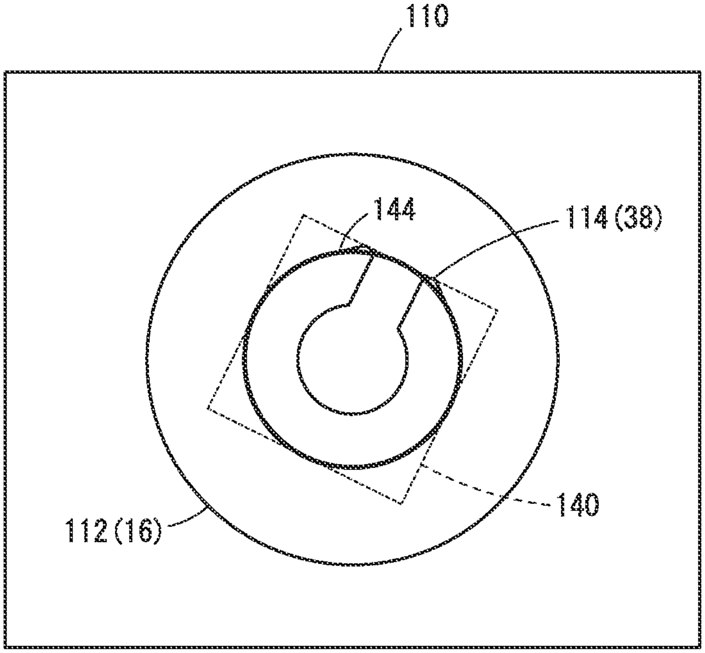
FIG. 7B is a diagram showing an image of the welded portion when part of a reflection region is missing.

FIGS. 7A and 7B show an image 110 obtained by performing binarization processing on the image 80 (see FIG. 3B). In the image 110, an image region 112 of the welded portion 16 corresponding to the image region 82 and an image region 114 of the reflection region 38 corresponding to the image region 84 are captured.

Figure 8:
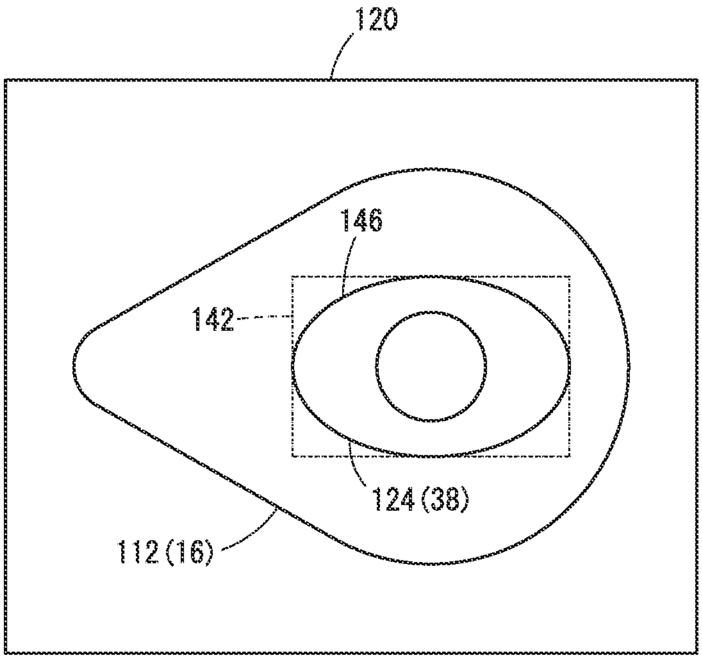
FIG. 8 is a diagram illustrating an image of a welded portion when the welded portion has an ellipsoidal shape.

FIG. 8 shows an image 120 obtained by performing binarization processing on the image 90 (see FIG. 3C). In the image 120, an image region 122 of the welded portion 16 corresponding to the image region 92 and an image region 124 of the reflection region 38 corresponding to the image region 94 are captured.

In the image after the binarization processing, the outer periphery of the image region of the reflection region 38 becomes clear. Thus, noise at the outer periphery of the image region is removed. In the following description, the outer periphery of the image region of the reflection region 38 is also referred to as the outer periphery of the reflection region 38. Further, the image processing unit 44 may perform expansion processing or contraction processing on the binarized image.

In step S5 of FIG. 4, the outer periphery circularity calculation unit 46 (see FIG. 1) calculates the (degree of) circularity of the outer periphery of the reflection region 38 by using the binarized image of the welded portion 16. The circularity of the outer periphery of the reflection region 38 is expressed by the following Equation (1). In Equation (1), the "area of the reflection region" refers to the area of the image region of the reflection region 38 in the image of the welded portion 16. The "total length of the outer periphery of the reflection region" refers to the length of the outer periphery of the image region of the reflection region 38 in the image of the welded portion 16.

$$\text{(Circularity of Outer Periphery of Reflection Region)} = 4\times\pi\times\text{(Area of Reflection Region)}/\text{(Total Length of Outer Periphery of Reflection Region)}^2 \quad (1)$$

The circularity of the outer periphery of the reflection region 38 is a real number in the range of 0 to 1. When the circularity is 1, the outer periphery of the reflection region 38 is a perfect circle. That is, as the degree of circularity approaches 1, the total length of the outer periphery of the reflection region 38 becomes shorter and the area of the reflection region 38 becomes larger. Specifically, as shown in FIG. 6, when the image region 104 of the reflection region 38 has a circular annular shape, the circularity of the outer periphery of the reflection region 38 is 1.

Further, as the degree of circularity approaches 0, the outer periphery of the reflection region 38 has a shape more different from a perfect circle. That is, as the circularity approaches 0, the total length of the outer periphery of the reflection region 38 becomes longer and the area of the reflection region 38 becomes smaller. Therefore, the reflection region 38 has a complicated shape. To be specific, when a part of the image region 114 of the reflection region 38 is missing as shown in FIGS. 7A and 7B, the area of the image region 114 becomes small. In addition, since the inner portion of the image region 114 becomes a part of the outer periphery, the entire length of the outer periphery of the reflection region 38 becomes long. As a result, the circularity of the outer periphery of the reflection region 38 becomes close to 0. When the image region 124 of the reflection region 38 is elliptical as shown in FIG. 8, the degree of circularity of the outer periphery of the reflection region 38 is close to 0.

In step S6 of FIG. 4, the outer dimension acquisition unit 48 (see FIG. 1) acquires the dimension (size) L (see FIG. 2) of the welded portion 16 using the binarized image of the welded portion 16. Specifically, as shown in FIG. 6, the outer dimension acquisition unit 48 sets rectangular detection regions 130 at both end portions of the image region 102 of the welded portion 16 in the binarized image 100 of the welded portion 16. Next, the outer dimension acquisition unit 48 sets a straight line 132 extending in the left-right direction for each of the two detection regions 130. Next, the outer dimension acquisition unit 48 detects an end portion (edge) of the image region 102 by moving the straight line 132 in the vertical direction within the detection region 130. Next, the outer dimension acquisition unit 48 calculates an interval Lt between the two straight lines 132. Next, the outer dimension acquisition unit 48 acquires the dimension L of the welded portion 16 by converting the calculated interval Lt into an actual interval between both end portions of the welded portion 16. The outer dimension acquisition unit 48 can also acquire the dimension L of the welded portion 16 by using the images 110 and 120 shown in FIGS. 7A to 8.

In step S7 of FIG. 4, the primary determination unit 50 (see FIG. 1) calculates the product of the circularity of the outer periphery of the reflection region 38 (see FIG. 2) and the dimension L of the welded portion 16. Next, the primary determination unit 50 determines whether or not the calculated product is equal to or greater than a primary determination threshold (second threshold). The primary determination threshold is a threshold for determining whether or not the shape of the outer periphery of the reflection region 38 is close to a perfect circle.

In step S7, when the calculated product is equal to or greater than the primary determination threshold (step S7: YES), the primary determination unit 50 proceeds to step S8. As noted above, the ideal shape of the welded portion 16 is spherical. In a case where the welded portion 16 has a spherical shape, when the circular annular light 32 is projected onto the welded portion 16, the outer periphery of the reflection region 38 has a shape close to a perfect circle. As a result, the circularity of the outer periphery of the reflection region 38 becomes close to 1, and the calculated product becomes equal to or greater than the primary determination threshold. Accordingly, in step S8, the primary determination unit 50 determines that the welding state of the welded portion 16 is good when the calculated product is equal to or greater than the primary determination threshold.

In step S7, when the calculated product is less than the primary determination threshold (step S7: NO), the primary determination unit 50 estimates that the welding state of the welded portion 16 is defective.

To be specific, even if the welded portion 16 has a spherical shape, when dust adheres to the upper portion 34 of the welded portion 16, a part of the image region 114 of the reflection region 38 is missing as shown in FIGS. 7A and 7B, and thus, the circularity of the outer periphery of the reflection region 38 is close to 0. As a result, the product of the circularity of the outer periphery of the reflection region 38 and the dimension L of the welded portion 16 is less than the primary determination threshold. Therefore, even if the welded portion 16 is spherical (i.e., the welding state of the welded portion 16 is good), the primary determination unit 50 (see FIG. 1) estimates that the welding state of the welded portion 16 is defective because the calculated product is less than the primary determination threshold.

When the welded portion 16 has an elliptical shape, the image region 124 of the reflection region 38 has an elliptical shape as illustrated in FIG. 8, and thus the circularity of the outer periphery of the reflection region 38 is close to 0. Also in this case, since the product of the circularity of the outer periphery of the reflection region 38 and the dimension L of the welded portion 16 is less than the primary determination threshold, the primary determination unit 50 (see FIG. 1) estimates that the welding state of the welded portion 16 is defective.

As described above, with only the determination process by the primary determination unit 50, as shown in FIGS. 7A and 7B, even if the welded portion 16 has a spherical shape, there are cases where the welding state of the welded portion 16 may be erroneously determined to be defective due to adhesion of dust.

Figure 5:
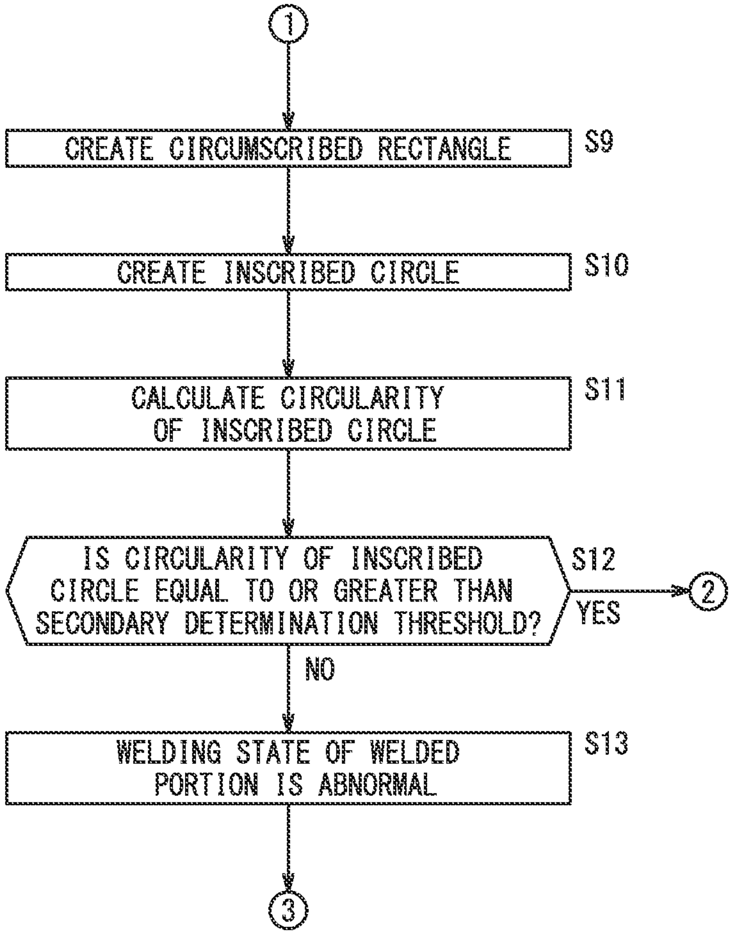
FIG. 5 is a flowchart showing the operation of the welded portion inspection device (welded portion inspection method)

Therefore, in the welded portion inspection device 10 (see FIG. 1) according to the present embodiment, in order to prevent the occurrence of the above-described erroneous determination, the determination process by the secondary determination unit 58 illustrated in FIG. 5 is performed on the image of the welded portion 16 estimated to be abnormal by the primary determination unit 50.

To be specific, when the result is determined as negative in step S7 of FIG. 4 (step S7: NO), the processing unit 40 (see FIG. 1) proceeds to step S9 of FIG. 5. In step S9, the circumscribed rectangle creation unit 52 creates circumscribed rectangles 140 and 142 (FIGS. 7A to 8) circumscribed around the outer periphery of the reflection region 38 for the binarized image of the welded portion 16 (FIG. 2) that has been estimated to be abnormal.

In step S10, the inscribed circle creation unit 54 creates inscribed circles 144 and 146 (see FIG. 7B and FIG. 8) inscribed in the circumscribed rectangles 140 and 142.

In step S11, the inscribed circle circularity calculation unit 56 calculates the circularities of the inscribed circles 144 and 146. The circularity of the inscribed circle 144, 146 is expressed by the following Equation (2).

$$(\text{Circularity of Inscribed Circle})=4\times\pi\times(\text{Area inside Inscribed Circle})/(\text{Total Length of Circumference of Inscribed Circle})^2 \quad (2)$$

In step S12, the secondary determination unit 58 determines whether or not the circularity calculated by the inscribed circle circularity calculation unit 56 is equal to or greater than a secondary determination threshold (first threshold). The secondary determination threshold is a threshold for determining whether or not the shape of the inscribed circle 144, 146 is close to a perfect circle.

In step S12, when the calculated product is equal to or greater than the secondary determination threshold (step S12: YES), the secondary determination unit 58 proceeds to step S8 in FIG. 4.

The inscribed circles 144 and 146 (see FIGS. 7B and 8) are apparent circles (assumed circles) simulating the outer periphery of the reflection region 38 when no dust adheres to the welded portion 16. If the welded portion 16 has a spherical shape, when the circular annular light 32 is projected onto the welded portion 16, the inscribed circle has a shape close to a perfect circle. As a result, the circularity of the inscribed circle is close to 1 and is equal to or greater than the secondary determination threshold. Accordingly, in step S8, the secondary determination unit 58 (see FIG. 1) determines that the welding state of the welded portion 16 is good if the calculated circularity of the inscribed circle is equal to or greater than the secondary determination threshold.

To be specific, as shown in FIGS. 7A and 7B, even if dust adheres to the upper portion 34 (see FIG. 2) of the welded portion 16 and a part of the image region 114 of the reflection region 38 is missing, if the welded portion 16 is spherical, the inscribed circle 144 becomes close to a perfect circle. As a result, the circularity of the inscribed circle 144 becomes close to 1 and is equal to or greater than the secondary determination threshold. As a result, the secondary determination unit 58 (see FIG. 1) determines that the welding state of the welded portion 16 is good. As described above, even when the primary determination unit 50 estimates that the welding state is defective, the secondary determination unit 58 determines that the welding state is good, and thus it is possible to prevent occurrence of erroneous determination.

In step S12 of FIG. 5, when the calculated circularity of the inscribed circle is less than the secondary determination threshold (step S12: NO), the secondary determination unit 58 (see FIG. 1) proceeds to step S13. In step S13, the secondary determination unit 58 determines that the welding state of the welded portion 16 is defective.

Specifically, as illustrated in FIG. 8, when the welded portion 16 has an elliptical shape, since the image region 124 of the reflection region 38 has an elliptical shape, a circumscribed rectangle 142 that is circumscribed around the outer periphery of the reflection region 38 has a rectangular (oblong) shape. As a result, the inscribed circle 146 inscribed in the circumscribed rectangle 142 becomes an ellipse. As a result, the circularity of the inscribed circle 146 is close to 0 and less than the secondary determination threshold. Therefore, the secondary determination unit 58 (see FIG. 1) determines that the welding state of the welded portion 16 is defective. That is, when the welded portion 16 is not spherical, the welding state of the welded portion 16 is determined to be defective in both the primary determination unit 50 and the secondary determination unit 58.

In the above description, the case where the quality of the welding state of one welded portion 16 is inspected has been described. When the quality of the welding state is inspected for the plurality of welded portions 16, the quality of the welding state may be inspected by executing the process of step S4 to step S13 for each of the plurality of welded portions 16.

The invention that can be grasped from the above embodiment will be described below.

A first aspect of the present invention is characterized by the welded portion inspection device (10) for inspecting quality of the welded portion (16) between the tips (14) of the coils (12), the welded portion inspection device (10) including: the illumination unit (22) configured to project light (32) having a circular cross-sectional outer shape onto the welded portion; the imaging unit (20) configured to capture the image (70, 80, 90) of the welded portion, the image including the reflection region (38) of the light in the welded portion; the circumscribed rectangle creation unit (52) configured to create the circumscribed rectangle (140, 142) which is circumscribed around the outer periphery of the reflection region, in the image captured by the imaging unit; the inscribed circle creation unit (54) configured to create the inscribed circle (144, 146) inscribed in the circumscribed rectangle created by the circumscribed rectangle creation unit; the first circularity calculation unit (56) configured to calculate the degree of circularity of the inscribed circle created by the inscribed circle creation unit; and the first determination unit (58) configured to determine that the welding state of the welded portion (16) is normal when the degree of circularity calculated by the first circularity calculation unit is equal to or greater than the first threshold.

According to the present invention, it is possible to improve work efficiency and determination accuracy of inspection for the welding state of a welded portion.

More specifically, in the present invention, by using the (degree of) circularity of the inscribed circle, it is possible to determine whether or not the welding state of the welded portion is normal or not with minimum data.

Further, in the present invention, since the light having a circular shape is projected onto the welded portion, in a case where the ideal shape of the welded portion is spherical, if the welded portion has a spherical shape, the image region of the reflection region included in the image of the welded portion becomes a circular shape. In addition, if the shape of the welded portion is not spherical, the image region of the reflection region has a shape other than a circle. Accordingly, it is possible to easily determine whether or not the welded portion has an abnormal shape with respect to the ideal shape.

Further, in the present invention, the inscribed circle which is an assumed circle is created by interpolating the shape of the reflection region, even when dust adheres to the welded portion. That is, an inscribed circle is created so as to be close to the outer shape of the actual reflection region, and the welding state of the welded portion is determined using the circularity of the created inscribed circle. As a result, the welding state of the welded portion can be accurately determined even when dust adheres to the welded portion. As a result, it is possible to suppress occurrence of erroneous determination of the welding state of the welded portion.

In the first aspect of the present invention, the welded portion inspection device may further include the image processing unit (44) that performs at least binarization processing on the image captured by the imaging unit, and the circumscribed rectangle creation unit may create the circumscribed rectangle circumscribed around the outer periphery of the reflection region, in the image on which the binarization processing has been performed.

Since the outer periphery of the reflection region becomes clear in the binarized image of the welded portion, it is possible to remove noise in the outer periphery of the reflection region. Accordingly, it is possible to further improve the determination accuracy with which the welding state of the welded portion is determined.

In the first aspect of the present invention, the welded portion inspection device may further include: the second circularity calculation unit (46) configured to calculate the circularity of the outer periphery of the reflection region in the image captured by the imaging unit; the acquisition unit (48) configured to acquire the dimension (L) of the welded portion in the image captured by the imaging unit; and the second determination unit (50) configured to determine that the welding state of the welded portion is normal when the product of the circularity of the outer periphery of the reflection region and the dimension of the welded portion is equal to or greater than the second threshold, and when the second determination unit determines that the welding state of the welded portion is abnormal, the circumscribed rectangle creation unit may create the circumscribed rectangle circumscribed around the outer periphery of the reflection region, in the image captured by the imaging unit.

Primary determination is performed by the second determination unit, and a circumscribed rectangle is created only for an image that has been determined to be abnormal by the second determination unit. Accordingly, it is possible to further suppress the occurrence of erroneous determination of the welding state of the welded portion while improving the work efficiency of the inspection of the welding state of the welded portion.

In the first aspect of the present invention, the illumination unit may project the light having a circular annular shape onto the welded portion.

As a result, when the welded portion is spherical, a circular annular reflection region is formed. Further, when the welded portion is not spherical, a reflection region having a distorted shape is formed. As a result, it is possible to more accurately determine whether the welding state of the welded portion is good or defective.

In the first aspect of the present invention, the imaging unit may capture the image of the welded portion including the reflection region, through the central portion of the light.

Accordingly, when the welded portion is spherical, it is possible to capture the image of the welded portion including the circular annular reflection region. In addition, when the welded portion is not spherical, it is possible to capture the image of the welded portion including a reflection region having a distorted shape. As a result, it is possible to more accurately determine whether the welding state of the welded portion is good or poor (defective) using the captured image of the welded portion.

In the first aspect of the present invention, the plurality of slots may be formed in the stator (28) of the rotary electric machine, the coils may be mounted respectively in the plurality of slots, and the welded portion may be a weld bead formed when the tip of the coil protruding from one slot of the slots in an axial direction of the stator and the tip of the coil protruding from another slot of the slots in the axial direction are joined by welding. The illumination unit may project the light onto the weld bead along the axial direction.

Thus, it is possible to accurately determine whether the welding state of the weld bead is good or poor.

A second aspect of the present invention is characterized by the welded portion inspection method for inspecting quality of the welded portion between the tips of the coils, the method including the steps of: projecting light having a circular cross-sectional outer shape onto the welded portion (S2); capturing the image of the welded portion, the image including the reflection region of the light in the welded portion (S3); creating the circumscribed rectangle which is circumscribed around the outer periphery of the reflection region, in the captured image (S9); creating the inscribed circle which is inscribed in the created circumscribed rectangle (S10); calculating the degree of circularity of the created inscribed circle (S11); and determining that the welding state of the welded portion is normal when the calculated degree of circularity is equal to or greater than a first threshold (S12, S8).

Also in the present invention, the above-described advantageous effects can be easily obtained.

Note that the present invention is not limited to the embodiment described above, and various configurations can be adopted therein without departing from the essence and gist of the present invention.

What is claimed is:

1. A welded portion inspection device for inspecting quality of a welded portion between tips of coils, the welded portion inspection device comprising one or more processors configured to execute computer-executable instructions stored in a memory, wherein the welded portion is formed by joining tips of two coils to each other by welding, and the one or more processors execute the computer-executable instructions to cause the welded portion inspection device to:

project light having a circular cross-sectional outer shape onto the welded portion;

capture an image of the welded portion, the image including a reflection region of the light in the welded portion;

perform at least binarization processing on the captured image to make an outer periphery of the reflection region clear;

create a circumscribed rectangle which is circumscribed around the outer periphery of the reflection region, in the image on which the binarization processing has been performed;

create an inscribed circle which is inscribed in the created circumscribed rectangle;

calculate a degree of circularity of the created inscribed circle; and determine that a welding state of the welded portion is normal when the calculated degree of circularity is equal to or greater than a first threshold.

2. The welded portion inspection device according to claim 1, wherein the one or more processors cause the welded portion inspection device to:

calculate a degree of circularity of the outer periphery of the reflection region in the captured image;

acquire a dimension of the welded portion in the captured image;

determine that the welding state of the welded portion is normal when a product of the degree of circularity of the outer periphery of the reflection region and the dimension of the welded portion is equal to or greater than a second threshold; and when it is determined that the welding state of the welded portion is abnormal, create the circumscribed rectangle circumscribed around the outer periphery of the reflection region, in the captured image.

3. The welded portion inspection device according to claim 1, wherein the one or more processors cause the welded portion inspection device to project the light having a circular annular shape onto the welded portion.

4. The welded portion inspection device according to claim 3, wherein the one or more processors cause the welded portion inspection device to capture the image of the welded portion including the reflection region, through a central portion of the light.

5. The welded portion inspection device according to claim 1, wherein a plurality of slots are formed in a stator of a rotary electric machine, the coils are mounted respectively in the plurality of slots, and the welded portion is a weld bead formed when the tip of the coil protruding from one slot of the slots in an axial direction of the stator and the tip of the coil protruding from another slot of the slots in the axial direction are joined by welding, and wherein the one or more processors cause the welded portion inspection device to project the light onto the weld bead along the axial direction.

6. A welded portion inspection method for inspecting quality of a welded portion between tips of coils, wherein the welded portion is formed by joining tips of two coils to each other by welding, the method comprising:

projecting light having a circular cross-sectional outer shape onto the welded portion;

capturing an image of the welded portion, the image including a reflection region of the light in the welded portion;

performing at least binarization processing on the captured image to make an outer periphery of the reflection region clear;

creating a circumscribed rectangle which is circumscribed around the outer periphery of the reflection region, in the image on which the binarization processing has been performed;

creating an inscribed circle which is inscribed in the created circumscribed rectangle;

calculating a degree of circularity of the created inscribed circle; and determining that a welding state of the welded portion is normal when the calculated degree of circularity is equal to or greater than a first threshold.

* * * * *